United States Patent
Schierling

(10) Patent No.: US 7,622,886 B2
(45) Date of Patent: Nov. 24, 2009

(54) METHOD FOR DETERMINATION OF THE RISK TO DISTURBANCE-FREE OPERATION OF A FREQUENCY CONVERTER

(75) Inventor: Hubert Schierling, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 487 days.

(21) Appl. No.: 11/570,841

(22) PCT Filed: Jun. 21, 2005

(86) PCT No.: PCT/EP2005/052896
§ 371 (c)(1),
(2), (4) Date: Dec. 18, 2006

(87) PCT Pub. No.: WO2006/000558
PCT Pub. Date: Jan. 5, 2006

(65) Prior Publication Data
US 2008/0272727 A1  Nov. 6, 2008

(30) Foreign Application Priority Data
Jun. 24, 2004 (DE) ........................ 10 2004 030 536

(51) Int. Cl.
*H02P 27/04* (2006.01)
(52) U.S. Cl. .......................... 318/807; 363/34; 363/37; 307/125; 307/126; 307/129; 307/130; 307/131; 700/294; 700/293; 700/297
(58) Field of Classification Search ............... 318/807; 307/125, 126, 129, 130, 131; 700/294, 293, 700/297
See application file for complete search history.

(56) References Cited

U.S. PATENT DOCUMENTS 4,662,814 A * 5/1987 Suzuki et al. ............... 414/730

(Continued)

FOREIGN PATENT DOCUMENTS

DE      197 54 128 A1    6/1999

(Continued)

OTHER PUBLICATIONS

"Mehr Qualität für Ihr Netz: dank ewz und Siemens", Firmenzeitschrift ewz und Siemens, anlässllich ainer Tagung am May 4-6, 2004 ersteilt.

(Continued)

*Primary Examiner*—Rita Leykin
(74) *Attorney, Agent, or Firm*—Henry M. Feiereisen; Ursula B. Day

(57) ABSTRACT

The invention relates to a method for determining the chance of a disturbance-free operation of a frequency converter (2) connected to a feeding network (18). According to the invention, during the operation of said frequency converter (2), an intermediate circuit voltage ($U_{ZK}$) is continuously measured and a network-side intermediate circuit current ($i_{ZKmains}$) is continuously determined; these measuring quantities are compared with pre-determined operating values of the frequency converter (2), and quantities which are higher or lower than said values are respectively stored; and the frequency ($H_{ij}$) of said higher and lower measuring quantities is determined and converted into a characteristic number for the quality of the feeding network (18). As said characteristic number decreases, the chance of a disturbance-free operation of the frequency converter (2) increases. In this way, a frequency converter (2) is able to detect the risk of appliance disturbance or failure as a result of network disturbances before the operation is interrupted.

14 Claims, 5 Drawing Sheets

U.S. PATENT DOCUMENTS

| | | | | | |
|---|---|---|---|---|---|
| 5,280,419 | A | * | 1/1994 | Amler | 363/37 |
| 5,309,353 | A | * | 5/1994 | Schauder et al. | 700/54 |
| 5,627,734 | A | * | 5/1997 | Karlecik-Maier | 363/35 |
| 5,661,645 | A | * | 8/1997 | Hochstein | 363/89 |
| 5,667,994 | A | * | 9/1997 | Dilly et al. | 435/91.2 |
| 5,847,943 | A | * | 12/1998 | Vogel | 363/37 |
| 2005/0258795 | A1 | | 11/2005 | Choi | |

FOREIGN PATENT DOCUMENTS

| | | |
|---|---|---|
| DE | 199 24 550 A1 | 12/1999 |
| EP | 0 370 500 A2 | 5/1990 |
| JP | 05137244 A | 6/1993 |

OTHER PUBLICATIONS

Netzqualitätsregistrierer SIMEAS Q, Siemens-Produktkatalog SR 10.2.5, Ausgabe 2003.

Auszug aus der Siemens-Firmenschrift "Sicaro PQ Software zur Diagnose der Netzqualität", Ausgabe 01.02.00. S. 1-1 sowie S. 4-41 bis 4-44.

Barros J et al: "Measurement and analysis of voltage events in a low-voltage distribution network", Electrotechnical Conference, 2004, Melecon Mediterranean Dubrovnik, Croatia May 12-15, 2004, Piscataway, NJ USA, IEEE, US, May 12, 2004, Selten 1083-1086, XP010734918, ISBN: 0-7893- 8271.

Duran Gomez J et al: "A low cost approach to improve the performance of an adjustable speed drive (ASD) under voltage sags and short-term power interruptions", Oct. 12, 1998, Power Electronics Congress, 1998, CIEP 98, VI IEEE International Morelia, Mexico, Oct. 12-15, 1996, Piscataway, NJ, USA, IEEE, US, pp. 16-21, XP010324595, ISBN: 0-7803-5006-5.

Montano J C et al: "Power quality factor and line-disturbances measurements in three-phase systems", Power Electronics Specialists Conference, 2004, PESC 04, 2004 IEEE 35th Annual Aachen, Germany Jun. 20-25, 2004, Piscataway, NJ, USA, IEEE, US, Jun. 20, 2004, Selten 4064-4088, XP010739396, ISBN: 0-7803-8399-0, Seite 3084, Spalte 1 - Seite 3086, Spalte 1.

* cited by examiner

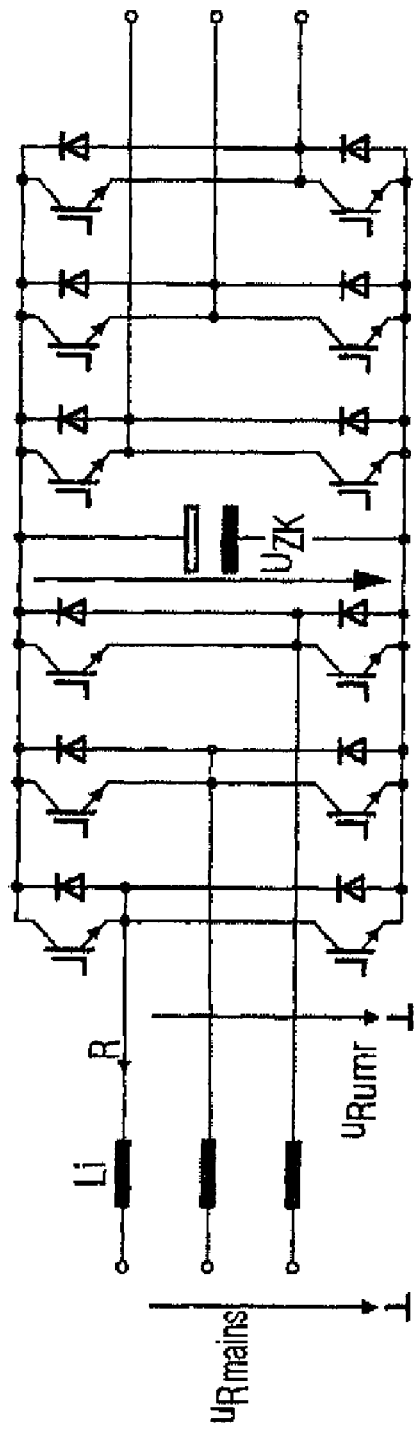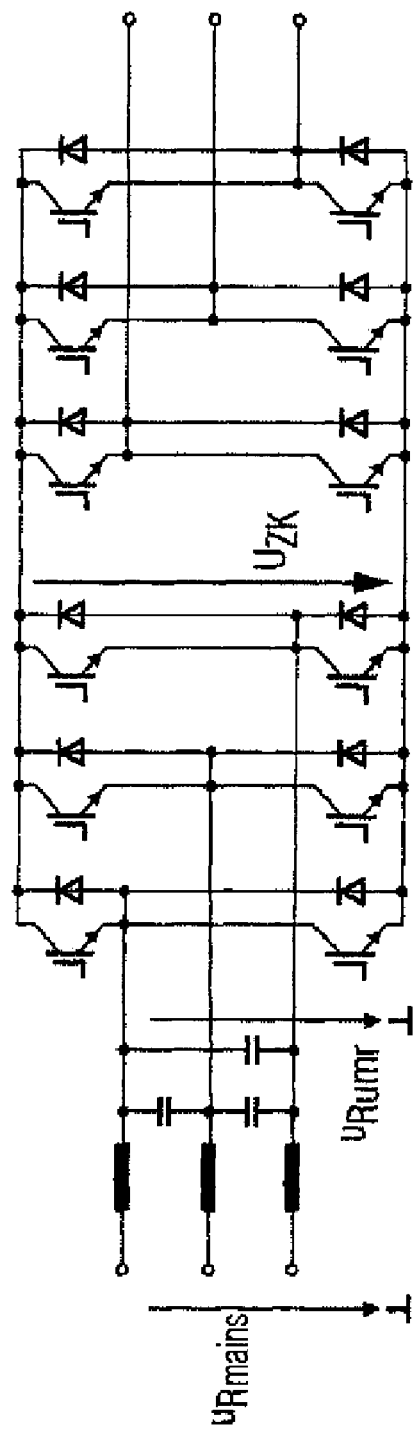

METHOD FOR DETERMINATION OF THE RISK TO DISTURBANCE-FREE OPERATION OF A FREQUENCY CONVERTER

BACKGROUND OF THE INVENTION

The invention relates to a method for determination of the risk for disturbance-free operation of a frequency converter which is connected to a feeding mains system.

In the case of frequency converters, in particular in the case of those in which diode rectifiers are used to feed a DC-voltage intermediate circuit, faults in the feeding mains system can lead to fault disconnections and even to destruction of the frequency converter.

By way of example, voltage dips in the feeding mains system to the frequency converter cause torque dips at the motor which is fed from the frequency converter. If the mains voltage returns with a steep gradient, this can lead to overvoltages in the DC-voltage intermediate circuit in the frequency converter, or to motor-side overcurrents. The rectifier diodes in the mains-side converter in the frequency converter are severely loaded by rapid recharging of the intermediate-circuit capacitor in the frequency converter. If voltage dips occur with the voltage subsequently returning with a steep gradient repeatedly and successively, then the rectifier diodes will be destroyed as a result of excessive temperature, resulting in failure of the frequency converter. Very high mains voltages can lead to overvoltage disconnection or to destruction of the frequency converter.

Until now, a frequency converter which is connected to a feeding mains system has been switched off when a permissible upper limit value or lower limit value for the intermediate-circuit voltage in the frequency converter is overshot or undershot, or the motor current becomes excessive. In some commercially-available frequency converters, the failure of one mains system phase of the feeding mains system is also identified, and is used as a disconnection criterion.

Since there may be many reasons for overvoltage and overcurrent fault messages and the fault is in general not directly reproducible, it is difficult to identify the mains voltage of the feeding mains system as a trigger for disconnection of the frequency converter. If a frequency converter has failed repeatedly with an overvoltage or overcurrent fault message and there is no application-specific or equipment-specific explanation for this, the service technician will record and then evaluate the mains voltage of the feeding mains system by means of a plotter, in particular a long-term plotter.

Since an unstable mains system always represents a risk to reliable operation of a frequency converter, and thus to an installation, it would be very helpful for an operator of an installation with motors that are fed from frequency converters for each frequency converter to be able to establish the quality of its feeding mains system and to emit an appropriate message, on reaching a hazard potential. In some circumstances, this would make it possible to prevent costly interrupts in operation.

SUMMARY OF THE INVENTION

The invention is now based on the object of specifying a method by means of which it is possible to determine the risk to disturbance-free operation of a frequency converter which is connected to a feeding mains system.

According to the invention, this object is achieved by a method for determination of the risk to disturbance-free operation of a frequency converter which is connected to a feeding mains system, with an intermediate-circuit voltage being measured continuously, and a mains-side intermediate-circuit current being determined continuously during operation of this frequency converter, with these measurement variables being compared with predetermined operating values of the frequency converter in such a manner that overshoots and undershoots are in each case stored, with the frequency of all overshoots and undershoots being determined and being converted to a characteristic factor for the quality of the feeding mains system.

According to the invention, measurement variables of a frequency converter, which are already available for control and protection purposes for the frequency converter, are recorded and stored, in terms of predetermined operating values being overshot and undershot, so that the total numbers of all overshoots and undershoots can be determined, and the quality of the mains system as well as the risk to disturbance-free operation of the frequency converter can be deduced from this. These measurement variables include the intermediate-circuit voltage and the mains-side intermediate-circuit current. This mains-side intermediate-circuit current is calculated as a function of the intermediate-circuit voltage of the motor-side intermediate-circuit current, and of the intermediate-circuit capacitance.

A mains system undervoltage is identified on the basis of the measured intermediate-circuit voltage, and a mains system overvoltage is identified on the basis of the measured intermediate-circuit voltage and a positive mains-side intermediate-circuit current. The mains-side intermediate-circuit current is used to identify a mains system overcurrent. Operating values of the frequency converter are predetermined in order to identify these faults. If these operating values are overshot or undershot, these are stored over a predetermined time period. In order to determine the risk to disturbance-free operation of a frequency converter, the total number of overshoots and undershoots of all measurement variables is determined, and this is used to calculate a characteristic factor for the quality of the feeding mains system.

In order to differentiate between the measurement range for the normal operating range and the disconnection range, this range is advantageously subdivided into a plurality of ranges. This makes it possible to establish the magnitude of an overshoot or undershoot of a measurement variable, without any need to store that value per se. This therefore results in an accumulation of overshoots and undershoots for each measurement variable, and these are distributed over a plurality of measurement ranges.

Since overshooting or undershooting of a measurement variable for example in a first measurement range and for example in a disconnection range are of different severity, all the frequencies of all the monitored measurement variables are advantageously weighted differently. Different weighting factors are used for this purpose.

All of these weighted frequencies of all the monitored measurement variables are added up to form a single characteristic factor. The higher this characteristic factor, the greater the number of overshoots and/or undershoots which have occurred in a predetermined time period. This means that the mains system quality decreases as the characteristic factor rises. The poorer the mains system quality is, the greater is the risk to undisturbed operation of a frequency converter on a mains system such as this. This determined characteristic factor is converted in order to make it possible to state a value for the mains system quality. This can be done by using the reciprocal, with limiting or subtraction from a constant value.

A warning message can advantageously also be generated as soon as the determined characteristic factor undershoots a predetermined value.

This method according to the invention identifies the risk of appliance faults or failures resulting from mains system disturbances even before this results in an interruption in operation. In consequence, the total number of failures of a frequency converter which is connected to a mains system is reduced, together with the disadvantages such as costs and image loss resulting from this. Disturbances resulting from mains system faults are thus found more quickly. The method according to the invention means that it is possible for a frequency converter to continuously determine, and if appropriate to indicate, the risk to undisturbed operation of the drive (frequency converter with the connected motor) while operation is continuing.

BRIEF DESCRIPTION OF THE DRAWING

The invention will be explained further with reference to the drawing, in which the method according to the invention is illustrated schematically.

FIG. 6 shows a frequency converter with an active front end, FIG. 7 shows a frequency converter with a mains-side converter, which is capable of reverse feeding and is clocked at the mains system frequency.

DETAILED DESCRIPTION OF PREFERRED EMBODIMENTS

Figure 1:
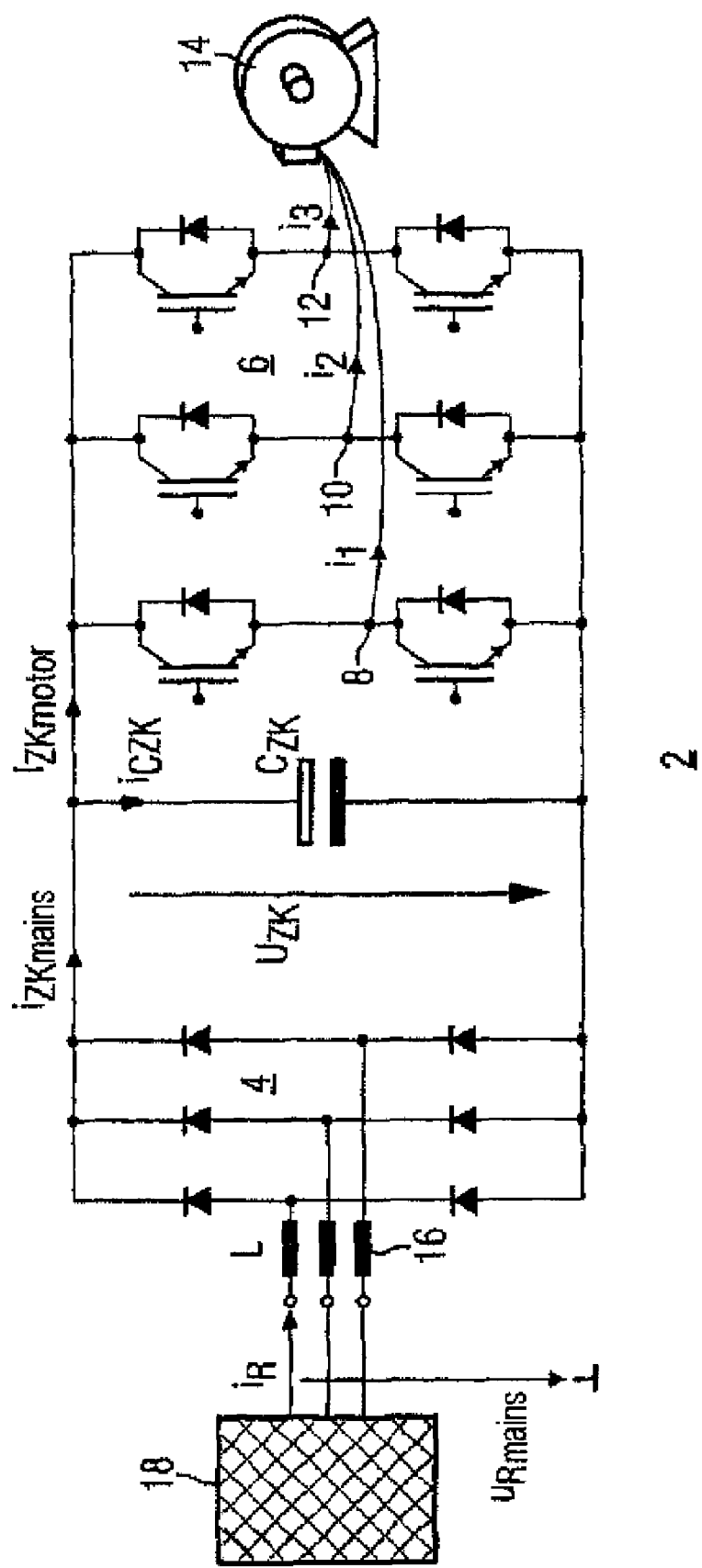
FIG. 1 shows a frequency converter with a diode feed connected to a feeding mains system.

FIG. 1 shows an equivalent circuit of a frequency converter 2 which, as a mains-side converter, has a diode rectifier 4 and, as a load-side converter, has a self-commutating pulse-controlled converter 6. The two converters are electrically linked to one another on the DC voltage side by means of a DC voltage intermediate circuit. This DC voltage intermediate circuit has an intermediate-circuit capacitor $C_{ZK}$, across which an intermediate circuit voltage $U_{ZK}$ is dropped. A motor 14 is connected to the phase outputs 8, 10 and 12 of the self-commutating pulse-controlled converter 6. The motor 14 and the frequency converter 2 form a so-called drive. On the input side, this frequency converter 2 has a mains system commutation inductor 16, which contains one inductance L for each mains system phase. This frequency converter 2 is connected to a feeding mains system 18 by means of this mains system commutation inductor 16.

The diode rectifier 4 uses the applied phase voltages $u_{Rmains}$, $U_{Smains}$, and $u_{Tmains}$ of the feeding mains system 18 to generate a rectified voltage, the intermediate-circuit voltage $U_{ZK}$, which is buffered by means of the intermediate-circuit capacitor $C_{ZK}$. In addition, this diode rectifier 4 produces an intermediate-circuit current $i_{Zkmains}$, which is composed of the phase currents $i_R$, $i_S$ and $i_T$ of the feeding mains system 18. This mains-side intermediate-circuit current $i_{ZKmains}$ is split into a charging current $i_{CZK}$ for the intermediate-circuit capacitor $C_{ZK}$ and a load-side intermediate-circuit current $i_{ZKmotor}$. For clarity reasons, of the phase voltages $U_{Rmains}$, $U_{Smains}$ and $U_{Tmains}$ and the phase currents $i_R$, $i_S$ and $i_T$, only those for the phase R are illustrated.

Since the value of the intermediate-circuit voltage $U_{ZK}$ depends directly on the amplitude of the mains voltage, a voltage dip has a direct noticeable effect on the intermediate-circuit voltage $U_{ZK}$. If the amplitude of the intermediate-circuit voltage $U_{ZK}$ falls below a lower predetermined value, then the frequency converter 2 is switched off. When the mains voltage rises to its original value again after a voltage dip, then an increased mains-side intermediate-circuit current $i_{ZKmains}$ flows. The steeper the voltage rise is, the greater is the mains-side intermediate-circuit current $i_{ZKmains}$. This means that the quality of the feeding mains system 18 thus governs the risk to disturbance-free operation of the frequency converter 2. The greater the number of voltage dips and mains system overcurrents that occur, the poorer is the quality of the feeding mains system 18. The poorer the quality of the feeding mains system 18 for the frequency converter 2, the greater is the risk to disturbance-free operation of the frequency converter 2. The quality of a mains system 18 thus has a major influence on disturbance-free operation of a frequency converter 2, and thus of a drive.

The intermediate-circuit voltage $U_{ZK}$ and the motor currents $i_1$, $i_2$ and $i_3$ are measured for control and protection purposes. The motor-side and mains-side intermediate-circuit currents $i_{ZKmotor}$ and $i_{ZKmains}$ are obtained with the aid of equations, without any further measurement variables. The motor power is calculated with the aid of these measured motor currents $i_1$, $i_2$ and $i_3$ and the output voltages of the self-commutating pulse-controlled converter 6 using the following equation:

$$P_{motor} = u_1 \cdot i_1 + u_2 \cdot i_2 + u_3 \cdot i_3 \tag{1}$$

This output voltage $u_1$, $u_2$ and $u_3$ of the frequency converter 2 does not need to be measured because the control device for the frequency converter 2 produces the nominal values of these output voltages. The following equation is used, as a function of this calculated motor power $P_{motor}$ and of the measured intermediate-circuit voltage $U_{ZK}$:

$$i_{ZKmotor} = P_{motor}/U_{ZK} \tag{2}$$

to obtain the value of the motor-side intermediate-circuit current $i_{ZKmotor}$. The mains-side intermediate-circuit current $i_{ZKmains}$ is obtained from the node rule as:

$$i_{ZKmains} = i_{CZK} + i_{Zkmotor} \tag{3}$$

with the charging current $i_{CZK}$ being calculated using the following equation:

$$i_{CZK} = C_{zk} \cdot dU_{ZK}/dt \tag{4}$$

A few simple computation operations are therefore carried out on the available measurement variables to obtain two measurement variables which can be evaluated with respect to mains system disturbances in the feeding mains system 18. The available measurement variables $U_{ZK}$ and $i_1$, $i_2$ and $i_3$ as well as $u_1$, $u_2$ and $u_3$ are available in every sampling step throughout overall operation.

Figure 2:
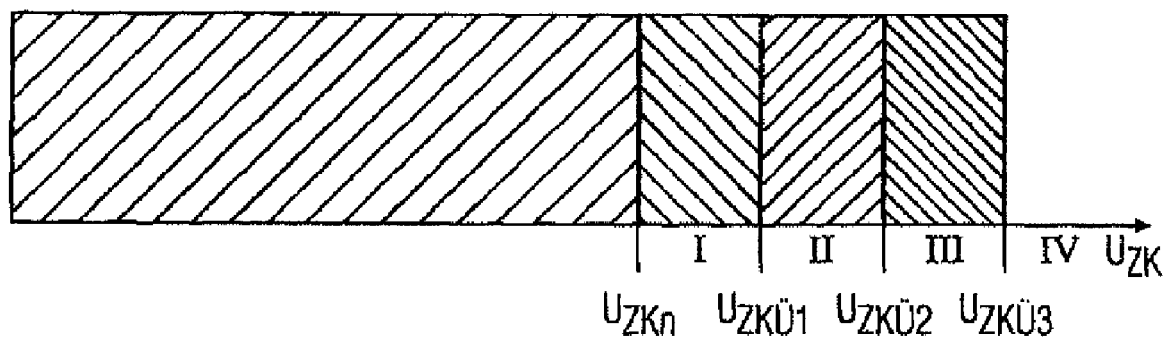
FIG. 2 shows a subdivision of a measurement variable range of a measurement variable into a plurality of sections.

FIG. 2 shows the measurement variable range, which is subdivided into a plurality of sections, for one measurement variable, in this case the intermediate-circuit voltage $U_{ZK}$. Since only the range above the normal operating range is of interest here, this range is subdivided into four sections I, II, III and IV. The section IV denotes an area in which the frequency converter 2 is switched off because the intermediate-circuit voltage $U_{ZK}$ is too high. The range between this disconnection range and the normal operating range is subdivided into three section I, II and III, thus resulting in staggering of the overvoltage of the intermediate-circuit voltage $U_{ZK}$. No voltage values need be stored, because of the use of the sections I to IV. All that is done is to count the number of sampling steps for each section I to IV in which the value of the measurement variable intermediate-circuit voltage $U_{ZK}$ was found to be within these respective sections I, II, III and IV.

A similar procedure is adopted for the excessively low intermediate-circuit voltage range.

Figure 3:
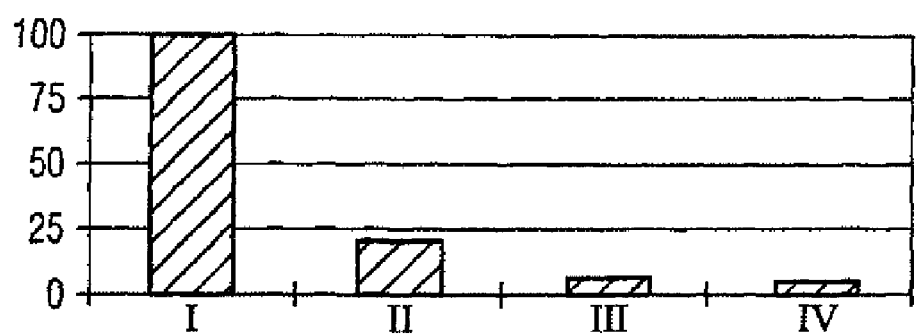
FIG. 3 shows a histogram of a measurement variable.

FIG. 3 uses a histogram to in each case show the number of sampling steps in the sections I to IV, schematically. This histogram shows, for example, the number of events—overshooting of the intermediate-circuit voltage $U_{ZKn}$ for the normal operating range—per day. At the end of the day, these frequencies are stored in a monthly memory. This time staggering results in the amount of memory being very small.

A histogram such as this is created for each measurement variable. All of the information is now combined to form a single characteristic figure $K_{mains}$, in order to make it possible to make a statement relating to the quality of the feeding mains system 18. In this case, the individual sections I to IV of the individual measurement variables are weighted differently. The characteristic figure $K_{mains}$ is calculated using the following equation.

$$K_{mains} = \Sigma\Sigma a_{ij} \cdot H_{ij} \qquad (5)$$

where
a weighting factor
H frequency
i Histogram ranges (sections I to IV)
j monitored variables (undervoltage, overvoltage, mains current . . . ).

The smaller this characteristic figure $K_{mains}$ is, the higher is the quality of the feeding mains system 18. This characteristic figure $K_{mains}$ can be converted to a characteristic factor, which reflects the quality of the feeding mains system 18. For example, the reciprocal of the characteristic figure $K_{mains}$ can be formed, or this characteristic figure $K_{mains}$ can be subtracted from a constant. In both cases, the characteristic factor is high for high quality and low for low quality. As the characteristic factor decreases starting from a maximum, the risk to disturbance-free operation of the frequency converter 2 rises.

Figure 4:
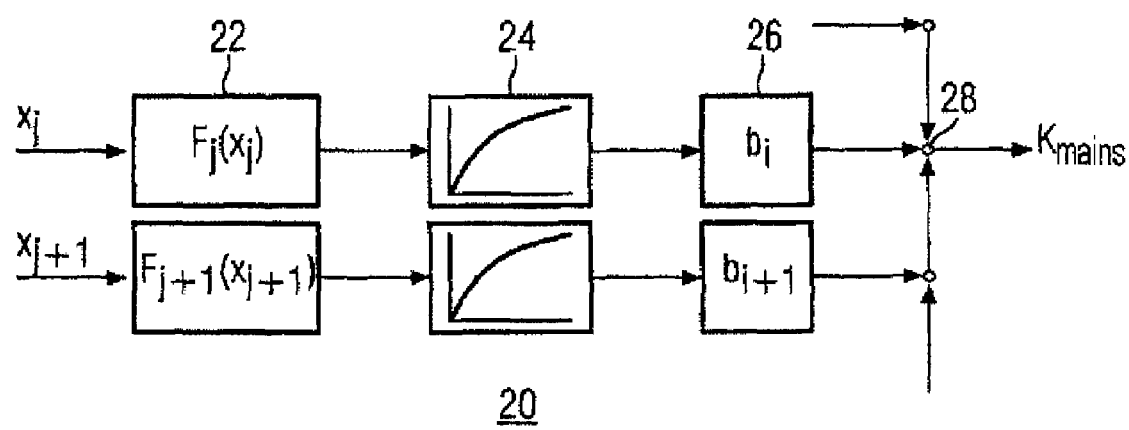
FIG. 4 shows an analog processing device for a plurality of measurement variables to form a characteristic factor.
Figure 5:
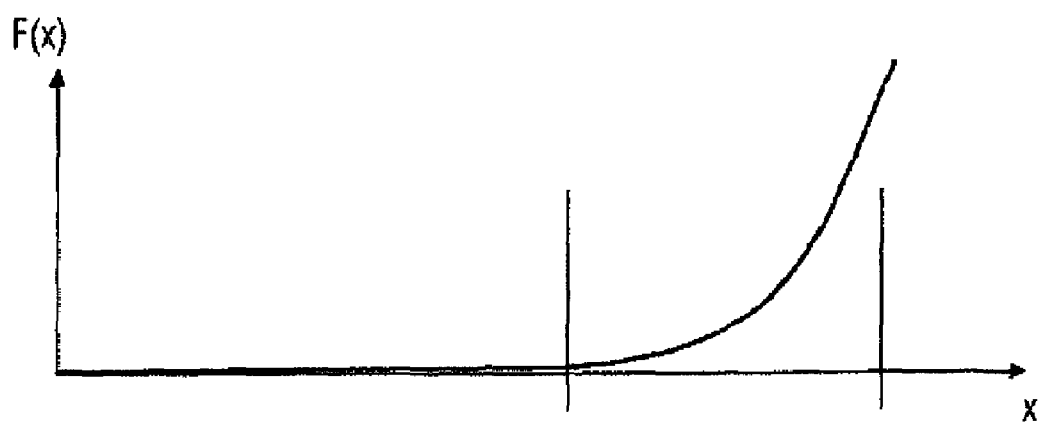
FIG. 5 shows a graph of a non-linear weighting function.

FIG. 4 shows an analog processing device 20 for a plurality of measurement variables to form a characteristic figure $K_{mains}$, illustrated schematically. This processing device 20 has one channel per measurement variable, comprising a functional element 22, a memory element 24 which contains an integrator, and a weighting device 26. On the output side, these processing channels are linked to one another by means of at least one adder 28. The characteristic figure $K_{mains}$ is produced at the output of this adder 28. A measurement variable $X_j$, $X_{j+1}$ is applied to the input of each processing channel. A function F(X) for non-linear weighting of a measurement variable $X_j$, $X_{j+1}$ is stored in the functional element 22. A function F(X) such as this is, for example, shown in more detail in the graph in FIG. 5. On the output side, the functional element 22 is linked to an input of the downstream memory element 24, which contains an integrator and whose output is linked to the weighting device 26. This processing device 20 represents an alternative to recording in the form of histograms. A warning can be emitted as a function of the determined characteristic figure $K_{mains}$, or of the converted characteristic factor, if a predetermined characteristic figure $K_{mains}$ or characteristic factor is overshot or undershot.

This method according to the invention can also be transferred to other converter topologies.

FIG. 6 shows a frequency converter with an active front end (AFE). This AFE has a self-commutating pulse-controlled converter. A frequency converter such as this thus in each case has a self-commutating pulse-controlled converter on the mains side and load side. The quality of the mains voltage is not of critical importance to AFE, since the intermediate-circuit voltage $U_{ZK}$ is sufficiently high that the mains-side pulse-controlled converter can still be controlled in its function as a rectifier, and mains system faults can generally be coped with. However, mains system faults, for example undervoltages down to very low values and with very steep mains voltage changes affect reliable operation even in the case of AFE. The mains current is measured for regulation of the AFE. The magnitude of the mains current vector that is formed can be used for analysis of the feeding mains system. The mains voltage is frequently measured directly even for regulation of the AFE. If this is not the case, this can be calculated using the following equation:

$$u_{Rmains} = u_{Rumr} - L \cdot di_R/dt \qquad (6)$$

In this case, $u_{Rmains}$ is the mains voltage of the phase R, $u_{Rumr}$ is the converter input voltage, determined from the intermediate-circuit voltage $U_{ZK}$ and a pulse pattern, for the phase R, L is the inductance of the AFE inductor, and $i_R$ is the measured output current of the AFE. A corresponding procedure is adopted for the other phases S and T. The mains voltage vector is calculated in a known manner from these calculated mains voltages $u_{Rmains}$, $u_{Smains}$ and $u_{Tmains}$. These mains system variables are then evaluated according to the invention.

FIG. 7 shows a further converter topology in which a controllable converter which is clocked at the mains system frequency is provided as the mains-side converter. A mains-side converter such as this is referred to as a fundamental frequency front end (F3E). In addition, this frequency converter no longer has an intermediate-circuit capacitor $C_{ZK}$. Instead, on the input side, this frequency converter has a mains filter. Since capacitors are located only on the mains side, that is to say upstream of the frequency converter, the mains current is not required as a measurement variable, since the charging current which is caused by a rapid return of the mains voltage does not load the frequency converter. In order to control the F3E, the intermediate-circuit voltage $U_{ZK}$ is measured directly and is used directly for processing of the mains voltage quality, which is the governing factor for operation.

Figure 8:
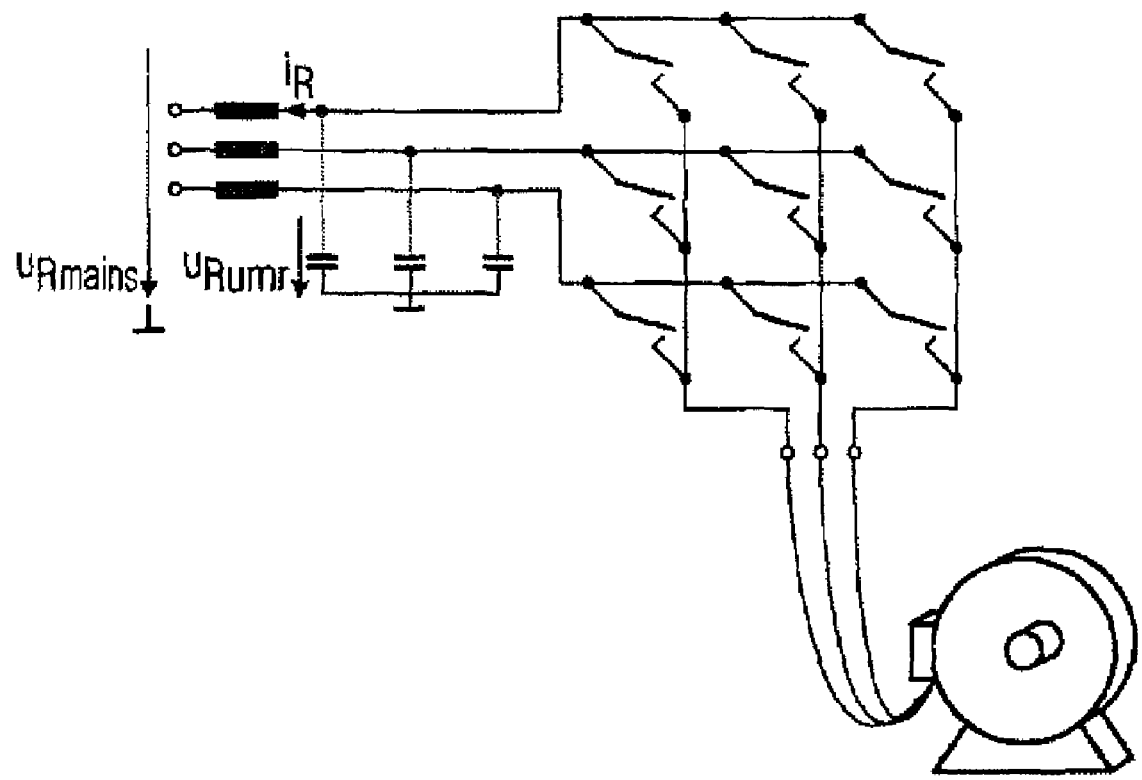
FIG. 8 shows a matrix converter.

A further converter topology is illustrated in more detail in FIG. 8. This converter topology is a matrix converter. The voltage of the mains-side capacitors is measured in a matrix converter. The mains filter inductors are in each case so small that any voltage dropped across them is negligible. The capacitor voltage is thus analyzed in order to determine the risk to disturbance-free operation resulting from mains system faults. The mains current is not required, since the converter current is dependent on the motor current and a pulse pattern.

This method according to the invention means that a frequency converter which is connected to a feeding mains system is now able to determine the quality of the feeding mains system without major effort, so that it is then possible to indicate the risk to disturbance-free operation. This results in the risk caused by appliance faults or failures resulting from mains system disturbances being identified even before this leads to an interruption in operation. This therefore reduces the total number of failures, with the disadvantages associated with them, such as costs and image loss.

What is claimed is:

1. A method for determining a risk to a disturbance-free operation of a frequency converter connected to a mains power supply, comprising the steps of:
   during operation of the frequency converter, continuously measuring an intermediate-circuit voltage and a mains-side intermediate-circuit current;
   comparing the measured intermediate-circuit voltage and measured mains-side intermediate-circuit current with preset operating values of the intermediate-circuit voltage and the mains-side intermediate-circuit current for the frequency converter;
   recording overshoots and undershoots of the measured intermediate-circuit voltage and measured mains-side intermediate-circuit current determined in the comparison;
   computing a frequency with which the overshoots and undershoots occur; and
   converting the computed frequency to a characteristic quality factor of the mains power supply.

2. The method of claim 1, further comprising subdividing a range of values where any one of the measured intermediate-circuit voltage and the measured mains-side intermediate-circuit current is above or below the preset operating values into a plurality of sections.

3. The method of claim 2, further comprising assigning a weighting factor to each of the plurality of sections.

4. The method of claim 1, further comprising generating a warning message if the characteristic quality factor is smaller than a predetermined quality factor of the mains power supply.

5. The method of claim 1, wherein the mains-side intermediate-circuit current is computed from a measured intermediate circuit voltage and a measured motor-side intermediate circuit current according to the following equation:

$$i_{ZKmains} = C_{Zk} \cdot dU_{ZK}/dt + i_{Zkmotor}$$

wherein $i_{ZKmains}$ is the mains-side intermediate-circuit current,
$i_{ZKmotor}$ is the motor-side intermediate-circuit current,
$C_{zk}$ is the intermediate-circuit capacitance, and
$dU_{ZK}/dt$ is the rate of change of the intermediate circuit voltage.

6. The method of claim 5, wherein the motor-side intermediate-circuit current is measured.

7. The method of claim 5, wherein the motor-side intermediate-circuit current is determined as a function of the measured intermediate-circuit voltage and a computed motor power according to the following equation:

$$i_{ZKmotor} = P_{motor}/U_{ZK}$$

wherein $i_{ZKmotor}$ is the motor-side intermediate-circuit current,
$U_{ZK}$ is the intermediate circuit voltage, and
$P_{motor}$ is the computed motor power.

8. The method of claim 7, wherein the motor power is computed from measured motor currents and preset motor voltages according to the following equation:

$$P_{motor} = u_1 \cdot i_1 + u_2 \cdot i_2 + u_3 \cdot i_3$$

wherein $U_1$, $u_2$, and $u_3$ are the preset motor voltages,
$i_1$, $i_2$, and $i_3$ are the measured motor currents, and
$P_{motor}$ is the computed motor power.

9. A method for determining a risk to a disturbance-free operation of a frequency converter connected to a mains power supply, comprising the steps of:
   during operation of the frequency converter, continuously measuring an intermediate-circuit voltage and a mains-side intermediate-circuit current;
   applying a non-linear weighting factor to the measured intermediate-circuit voltage and mains-side intermediate-circuit current;
   integrating the non-linearly weighted intermediate-circuit voltage and mains-side intermediate-circuit current; and
   adding the integrated, non-linearly weighted intermediate-circuit voltage and the integrated, non-linearly weighted mains-side intermediate-circuit current to produce a characteristic quality factor of the mains power supply.

10. The method of claim 9, further comprising generating a warning message if the characteristic quality factor is smaller than a predetermined quality factor of the mains power supply.

11. The method of claim 9, wherein the mains-side intermediate-circuit current is computed from a measured intermediate circuit voltage and a measured motor-side intermediate circuit current according to the following equation:

$$i_{ZKmains} = C_{zk} \cdot dU_{ZK}/dt + i_{Zkmotor}$$

wherein $i_{ZKmains}$ is the mains-side intermediate-circuit current,
$i_{ZKmotor}$ is the motor-side intermediate-circuit current,
$C_{zk}$ is the intermediate-circuit capacitance, and
$dU_{ZK}/dt$ is the rate of change of the intermediate circuit voltage.

12. The method of claim 11, wherein the motor-side intermediate-circuit current is measured.

13. The method of claim 11, wherein the motor-side intermediate-circuit current is determined as a function of the measured intermediate-circuit voltage and a computed motor power according to the following equation:

$$i_{ZKmotor} = P_{motor}/U_{ZK}$$

wherein $i_{ZKmotor}$ is the motor-side intermediate-circuit current,
$U_{ZK}$ is the intermediate circuit voltage, and
$P_{motor}$ is the computed motor power.

14. The method of claim 13, wherein the motor power is computed from measured motor currents and preset motor voltages according to the following equation:

$$P_{motor} = u_1 \cdot i_1 + u_2 \cdot i_2 + u_3 \cdot i_3$$

wherein $u_1$, $u_2$, and $u_3$ are the preset motor voltages,
$i_1$, $i_2$, and $i_3$ are the measured motor currents, and
$P_{motor}$ is the computed motor power.

* * * * *